United States Patent
Yoshida

(10) Patent No.: US 11,614,248 B2
(45) Date of Patent: Mar. 28, 2023

(54) TEMPERATURE CHARACTERISTIC EVALUATION METHOD

(71) Applicant: NAGANO SCIENCE CO., LTD, Osaka (JP)

(72) Inventor: Hidetoshi Yoshida, Osaka (JP)

(73) Assignee: NAGANO SCIENCE CO., LTD, Osaka (JP)

( * ) Notice: Subject to any disclaimer, the term of this patent is extended or adjusted under 35 U.S.C. 154(b) by 143 days.

(21) Appl. No.: 17/315,426

(22) Filed: May 10, 2021

(65) Prior Publication Data
US 2021/0262681 A1 Aug. 26, 2021

Related U.S. Application Data

(63) Continuation of application No. 16/209,358, filed on Dec. 4, 2018, now abandoned.

(51) Int. Cl.
| | |
|---|---|
| *F24F 11/30* | (2018.01) |
| *G06F 17/11* | (2006.01) |
| *F24F 11/63* | (2018.01) |
| *G01N 17/00* | (2006.01) |
| *F24F 110/10* | (2018.01) |

(52) U.S. Cl.
CPC ............ *F24F 11/30* (2018.01); *F24F 11/63* (2018.01); *G01N 17/00* (2013.01); *G06F 17/11* (2013.01); *F24F 2110/10* (2018.01)

(58) Field of Classification Search
CPC ........ F24F 11/30; F24F 11/63; F24F 2110/10; F24F 11/62; G01N 17/00; G01N 17/02; G01N 17/002; G06F 17/11
See application file for complete search history.

(56) References Cited

U.S. PATENT DOCUMENTS

| | | | | |
|---|---|---|---|---|
| 8,620,632 B2 * | 12/2013 | An | ......................... | G01K 17/20 703/2 |
| 9,546,914 B2 * | 1/2017 | Cox | ....................... | G01K 7/425 |
| 2013/0060510 A1 * | 3/2013 | Cox | ......................... | G01K 7/42 702/130 |

(Continued)

FOREIGN PATENT DOCUMENTS

JP 008275345 A * 11/2008 ............. G01N 17/00

*Primary Examiner* — Tung S Lau
(74) *Attorney, Agent, or Firm* — IP Business Solutions, LLC

(57) ABSTRACT

A temperature characteristic evaluation method includes the steps of acquiring temperature data, ambient temperature data, and internal temperature data are acquired. By changing at least one of the set temperature and the ambient temperature, a plurality of combinations of the set temperature data, the ambient temperature data, and the internal temperature data is obtained as a plurality of temperature data groups. A difference between the ambient temperature data and the set temperature data in each of the plurality of temperature data groups is calculated as the first difference. A difference between the internal temperature data and the set temperature data is calculated as the second difference. The combinations of the first and second differences are obtained as difference groups. The plurality of difference groups for the plurality of temperature data groups is approximated in a linear function, and the linear function is obtained as a temperature function.

8 Claims, 11 Drawing Sheets

(56) References Cited

U.S. PATENT DOCUMENTS

| | | | | |
|---|---|---|---|---|
| 2014/0379298 | A1* | 12/2014 | Gilbert | G01K 17/06 |
| | | | | 702/182 |
| 2017/0138628 | A1* | 5/2017 | Sondur | F24F 11/63 |
| 2018/0321288 | A1* | 11/2018 | Kitajima | G06Q 50/06 |
| 2018/0373276 | A1* | 12/2018 | Sondur | F24F 11/58 |
| 2019/0316794 | A1* | 10/2019 | Song | F24F 11/58 |

\* cited by examiner

TEMPERATURE CHARACTERISTIC EVALUATION METHOD

CROSS-REFERENCE TO RELATED APPLICATIONS

This is a continuation application claiming priority to U.S. patent application Ser. No. 16/209,358, filed on Dec. 4, 2018, which is incorporated herein by reference. The contents of this application are incorporated herein by reference in their entirety.

BACKGROUND OF THE INVENTION

Field of the Invention

The present invention relates to a temperature characteristic evaluation method for evaluating temperature characteristics of an internal space of a climate chamber.

Description of the Related Art

As a stability test for evaluating stability of medicines, a climate test in which the medicines are preserved for long-term in constant temperature and humidity is performed. In the climate test for the medicines, a constant climate chamber is used as one of the climate chambers (see e.g., Japanese Patent Application Publication No. 2008-275345 and Japanese Patent Application Publication No. 2010-107062). The constant climate chamber is provided with a test chamber, a humidifying part, a cooling part, a heating part, and a blowing part. The medicines are preserved for a regulated time period inside the test chamber in which the temperature and the humidity are maintained constantly by operating the humidifying part, the cooling part, the heating part, and the blowing part.

In the climate test for the medicines, it is required to guarantee a requirement of which the temperature and the humidity inside the test chamber of the constant climate chamber are maintained within a predetermined range during a preservation period. In general, the temperature and the humidity in a predetermined position inside the test chamber of the constant climate chamber are always measured by a monitoring sensor or a control sensor. Further, the uniformities of the temperature and the humidity inside the test chamber of the constant climate chamber are measured every fixed period (e.g., 1 year). Therefore, it is guaranteed that the temperature and the humidity inside the test chamber are maintained within a predetermined range during a preservation period. In this case, a document showing the climate test which is performed in a regulated condition is submitted to a related agency.

However, there is possibility of changing the temperature inside the test chamber by the influence of outside air. In the aforementioned method, in temperature uniformities measured in a period between a measurement point and a measurement point, in a position other than the positions where the monitoring sensor or the control sensor is set inside the test chamber, it cannot judge whether or not the temperature is maintained within a predetermined range. On the other hand, if a separate temperature sensor which is different from the monitoring sensor or the control sensor is used for monitoring the temperature inside test chamber all the time, the component cost such as a temperature sensor, etc. and the operation cost increase. Therefore, a method for evaluating temperature characteristics in an internal space with the consideration of outside air and with a low cost is desired.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

An object of the present invention is to provide a temperature characteristic evaluation method for evaluating temperature characteristics of an internal space of a climate chamber with a low cost and high reliability.

In some embodiments of the present disclosure, in a temperature characteristic evaluation method for evaluating temperature characteristics in an internal space of a climate chamber which operates to maintain a temperature in the internal space in a predetermined set temperature, the temperature characteristic evaluation method includes the steps of: (1) obtaining a set temperature of the climate chamber, which is set from a controller built in the climate chamber, as first set temperature data by a computer, acquiring an ambient temperature, which is a temperature inside a space where the climate chamber is placed, measured by a first temperature sensor installed inside the space as first ambient temperature data by the computer, and acquiring first internal temperature data by the computer based on an internal temperature inside the internal space measured by a second temperature sensor installed inside the space; (2) acquiring, when second set temperature is set, second set temperature data, second ambient temperature data which is a temperature of the space placed in the climate chamber, and second internal temperature data, which is an internal temperature of the internal space, in a similar manner as the step of (1) by changing the set temperature of the climate chamber to the second set temperature which is different from the first set temperature; (3) acquiring the first set temperature data, a first temperature data group which combines the first ambient temperature data and the first internal temperature data when the first set temperature is set, and the second set temperature data, and a second temperature data group which combines the second ambient temperature data and the second internal temperature data when the second set temperature is set, by the computer; (4) obtaining a differential group for each of the first temperature data group and the second temperature data group by calculating a difference between ambient temperature data and set temperature data as a first difference, calculating a difference between internal temperature data and set temperature data as a second difference by the computer, so as to obtain a combination of the first and second differences for the first temperature data group and a combination of the first and second differences for the second temperature data group as the differential groups; (5) approximating the differential group for each of the first and second temperature data groups by a regression analysis and obtaining the function obtained by the step of approximating as a temperature function by the computer; and (6) performing an evaluation related to the temperature characteristics of the internal space of the climate chamber by using the temperature function.

In some embodiments of the present disclosure, in the temperature characteristic evaluation method, the step of (6) performing the evaluation includes a step of setting an allowable range for a second difference as a second differential allowable range; a step of obtaining a second difference by the computer; and a step of calculating a margin level of the second difference at an upper limit value or a lower limit value of the second differential allowable range.

In some embodiments of the present disclosure, the step of obtaining the second difference includes a step of acquiring ambient temperature data based on an ambient temperature measured by the first temperature sensor at a first point of time after the temperature function is obtained and acquiring set temperature data, a step of calculating a first difference at the first point of time based on the acquired ambient temperature data and the acquired set temperature data at the first point of time, and a step of calculating a second difference at the first point of time based on the first difference at the first point of time and the temperature function.

In some embodiments of the present disclosure, the temperature characteristic evaluation method includes the steps of: (7) calculating an upper limit value and a lower limit value of a first differential allowable range, which is an allowable range of the first difference, by substituting an upper limit value and a lower limit value of the second differential allowable range to the second difference of the temperature function by the computer; and (8) calculating an upper limit value and a lower limit value of an allowable range of the ambient temperature data by the computer based on the upper limit value and the lower limit value of the first differential allowable range and the set temperature data.

In some embodiments of the present disclosure, the climate chamber includes an air-conditioning part, a blowout port blowing air conditioned by the air-conditioning part into the internal space, and a suction port suctioning air of the internal space into the air-conditioning part. The set temperature is a temperature of the air of the blowout port or the suction port.

In some embodiments of the present disclosure, in a temperature characteristic evaluation method for evaluating temperature characteristics in an internal space of a climate chamber which operates to maintain a temperature in the internal space in a predetermined set temperature, the temperature characteristic evaluation method includes the steps of: (1) obtaining a set temperature of the climate chamber, which is set from a controller built in the climate chamber, as first set temperature data by a computer, acquiring an ambient temperature, which is a temperature inside a space where the climate chamber is placed, measured by a temperature sensor installed inside the space as first ambient temperature data by the computer, and acquiring internal temperatures of the internal space in a plurality of positions respectively measured by a plurality of temperature sensors as first internal temperature data; (2) acquiring, when second set temperature is set, second set temperature data, second ambient temperature data which is a temperature of the space placed in the climate chamber, and the plurality of second internal temperature data, which is an internal temperature in each of a plurality of positions inside the internal space, in a similar manner as the step of (1) by changing the set temperature of the climate chamber to the second set temperature which is different from the first set temperature; (3) acquiring the first set temperature data, a first temperature data group which combines the first ambient temperature data and the first internal temperature data when the first set temperature is set, and the second set temperature data, and a second temperature data group which combines the second ambient temperature data and the second internal temperature data when the second set temperature is set, by the computer in the plurality of positions respectively; (4) obtaining a differential group for each of the first temperature data group and the second temperature data group in the plurality of positions by calculating a difference between ambient temperature data and set temperature data as a first difference, calculating a difference between a plurality of internal temperature data and set temperature data as a second difference by the computer, so as to obtain a combination of the first and second differences for the first temperature data group and a combination of the first and second differences for the second temperature data group as the differential group in the plurality of positions respectively; (5) approximating the differential group for each of the first and second temperature data groups by a regression analysis in each of the plurality of positions and obtaining a plurality of functions obtained by the step of approximating as temperature functions by the computer; and (6) performing an evaluation related to the temperature characteristics of the internal space of the climate chamber by using the plurality of temperature functions.

In some embodiments of the present disclosure, in the temperature characteristic evaluation method, the step of (6) performing the evaluation includes a step of setting an allowable range for a second difference as a second differential allowable range; a step of obtaining a second difference in each of the plurality of positions by the computer; and a step of calculating a margin level of the second difference at an upper limit value or a lower limit value of the second differential allowable range.

In some embodiments of the present disclosure, in the temperature characteristic evaluation method, the step of obtaining the second difference includes a step of acquiring ambient temperature data based on an ambient temperature measured by the first temperature sensor at a first point of time after the plurality of temperature functions is obtained and acquiring set temperature data, a step of calculating a first difference at the first point of time based on the acquired ambient temperature data and the acquired set temperature data at the first point of time, and a step of calculating a plurality of second differences at the first point of time based on the first difference at the first point of time and the plurality of temperature functions.

In some embodiments of the present disclosure, the temperature characteristic evaluation method further includes the steps of: (7) calculating an upper limit value and a lower limit value of a plurality of the first differential allowable ranges, which are an allowable range of the first difference, by substituting an upper limit value and a lower limit value of the second differential allowable range to the second difference of the plurality of temperature functions by the computer; and (8) calculating an upper limit value and a lower limit value of an allowable range of the ambient temperature data by the computer based on the upper limit value and the lower limit value of the plurality of the first differential allowable ranges and the set temperature data.

In some embodiments of the present disclosure, in the temperature characteristic evaluation method, the climate chamber includes an air-conditioning part, a blowout port blowing air conditioned by the air-conditioning part into the internal space, and a suction port suctioning air of the internal space into the air-conditioning part. The set temperature is a temperature of the air of the blowout port or the suction port.

In some embodiments of the present disclosure, in a temperature characteristic evaluation method for evaluating temperature characteristics in an internal space of a climate chamber which operates to maintain a temperature in the internal space in a predetermined set temperature, the temperature characteristic evaluation method includes the steps of: (1) obtaining a set temperature of the climate chamber, which is set from a controller built in the climate chamber, as first set temperature data by a computer, acquiring an ambient temperature, which is a temperature inside a space where the climate chamber is placed, measured by a temperature sensor installed inside the space as first ambient temperature data by the computer, and acquiring internal temperatures of the internal space in a plurality of positions respectively measured by a plurality of temperature sensors as first internal temperature data; (2) acquiring, when second set temperature is set, second set temperature data, second ambient temperature data which is a temperature of the space placed in the climate chamber, and the plurality of second internal temperature data, which is an internal temperature in each of a plurality of positions inside the internal space, in a similar manner as the step of (1) by changing the set temperature of the climate chamber to the second set temperature which is different from the first set temperature; (3) acquiring the first set temperature data, a first temperature data group which combines the first ambient temperature data, and the first internal temperature data when the first set temperature is set, and the second set temperature data, and a second temperature data group which combines the second ambient temperature data and the second internal temperature data when the second set temperature is set, by the computer in the plurality of positions respectively; (4) obtaining a differential group for each of the first temperature data group and the second temperature data group in the plurality of positions by calculating a difference between ambient temperature data and set temperature data as a first difference, calculating a difference between a plurality of internal temperature data and set temperature data as a second difference by the computer, so as to obtain a combination of the first and second differences for the first temperature data group and a combination of the first and second differences for the second temperature data group as the differential group in the plurality of positions respectively; (5) approximating the differential group for each of the first and second temperature data groups by a regression analysis in each of the plurality of positions and obtaining a plurality of functions obtained by the step of approximating as temperature functions by the computer; (6) setting an allowable range for a second difference as a second differential allowable range; (7) obtaining second differences in the plurality of positions at a second point of time after the plurality of temperature functions is obtained by the computer; (8) calculating margin levels of the second difference with respect to an upper limit value and a lower limit value of the second differential allowable range in the plurality of points; and (9) specifying a position having a margin level which is the maximum value or the minimum value among the margin levels of the second differential value in the plurality of positions.

In some embodiments of the present disclosure, in the temperature characteristic evaluation method, the step of (6) obtaining the second differences at the second point of time includes a step of acquiring ambient temperature data by measuring an ambient temperature at the second point of time by the temperature sensor installed inside the space where the climate chamber is placed and acquiring set temperature data, and a step of calculating a first difference at the second point of time based on the ambient temperature data acquired at the second point of time and the acquired set temperature data, and a step of calculating a plurality of second differences at the second point of time based on the first difference at the second point of time and the plurality of temperature functions.

In some embodiments of the present disclosure, in the temperature characteristic evaluation method, the climate chamber includes an air-conditioning part, a blowout port blowing air conditioned by the air-conditioning part into the internal space, and a suction port suctioning air of the internal space into the air-conditioning part. The set temperature is a temperature of the air of the blowout port or the suction port.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, a temperature characteristic evaluation method according to embodiments of the present invention will be described with reference to the drawings.

(1) Structure of Constant Climate Chamber

Figures 1A, 1B:
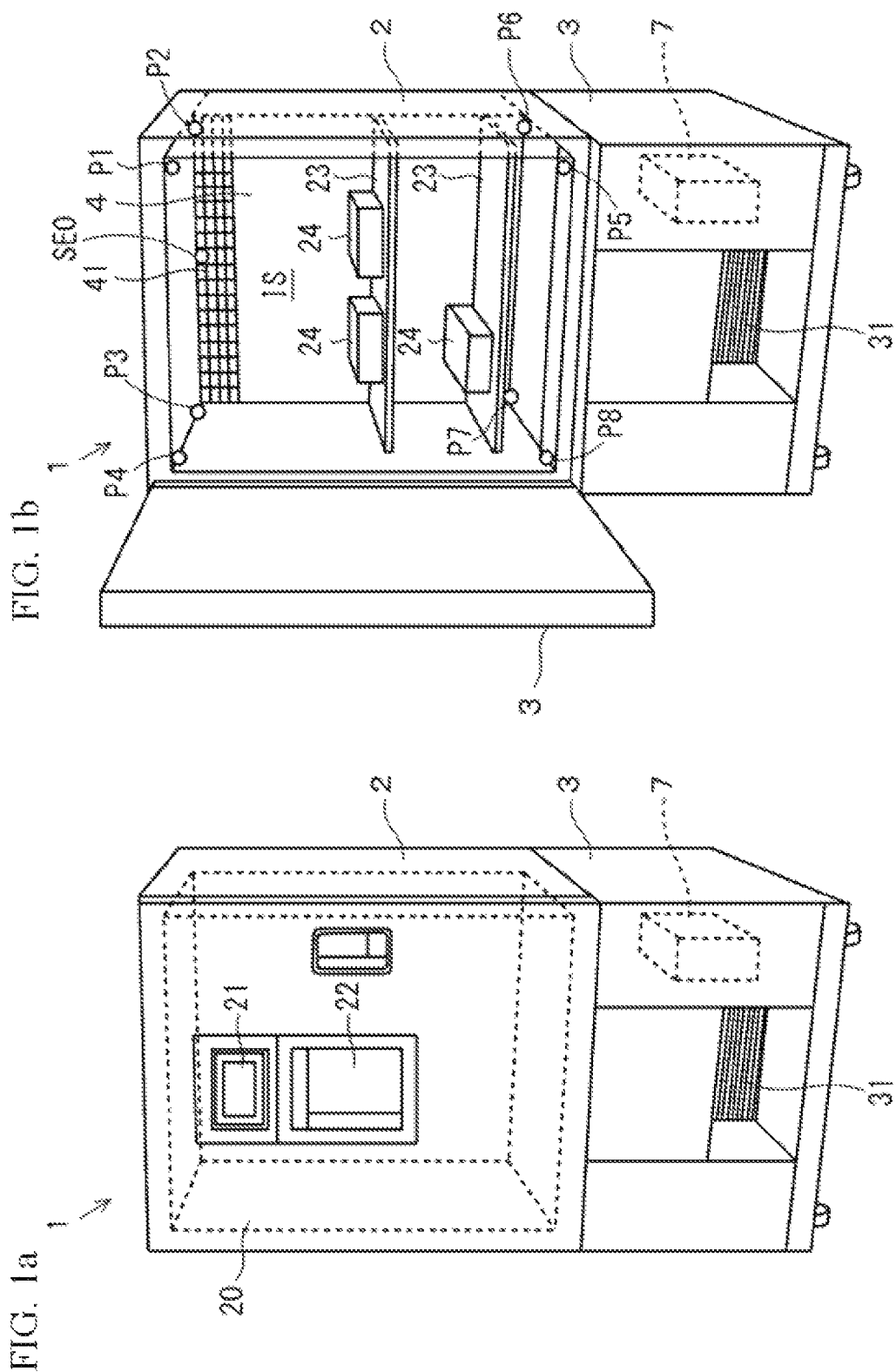
FIG. 1a is a perspective view showing a constant climate chamber used for a temperature characteristic evaluation method according to the present embodiment.
FIG. 1b is a perspective view showing a state in which a door of the constant climate chamber of FIG. 1a is opened.
Figure 2:
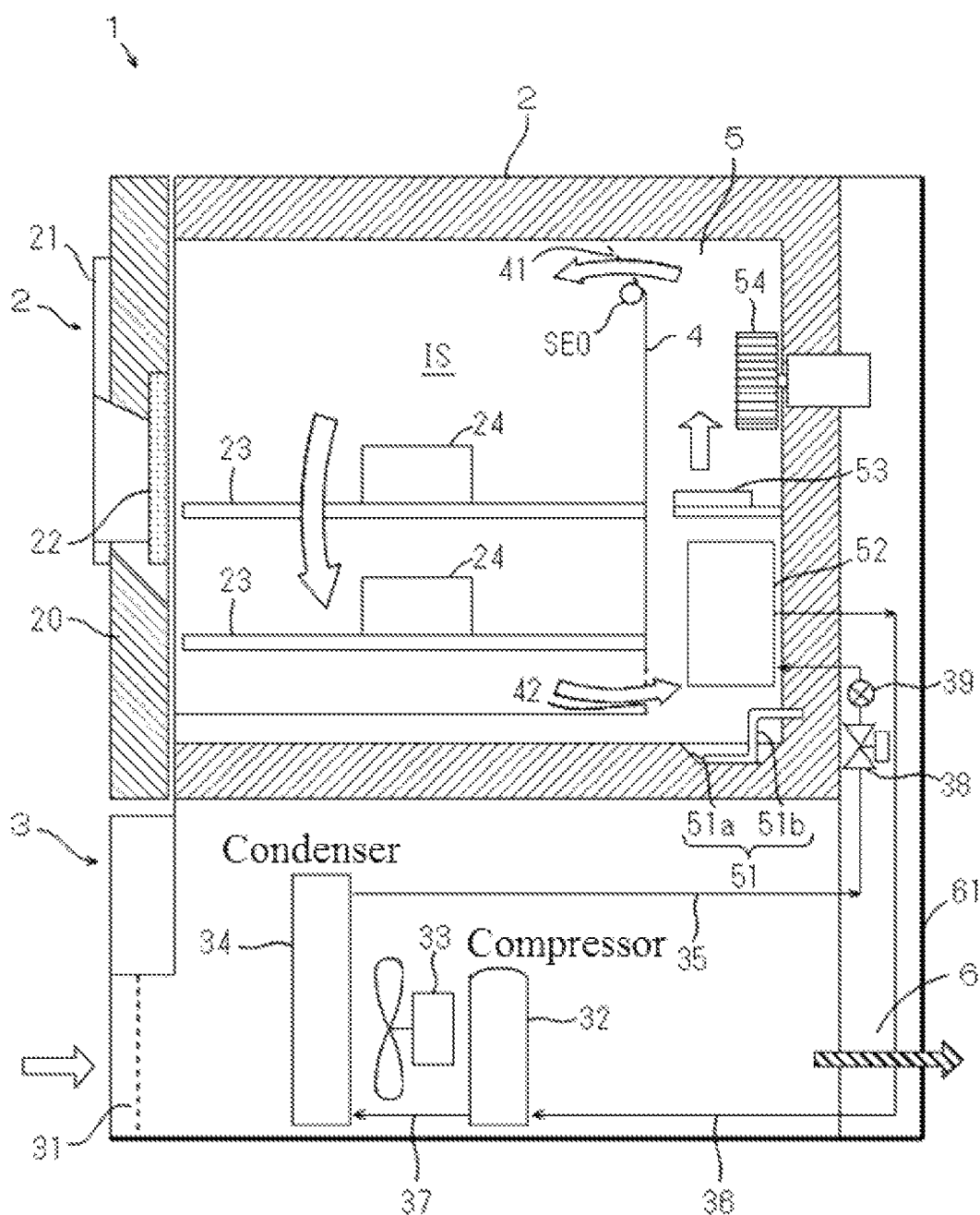
FIG. 2 is a vertical cross-sectional view of the constant climate chamber of FIGS. 1a and 1b.

FIG. 1a is a perspective view showing a constant climate chamber used for a temperature characteristic evaluation method according to the present embodiment. FIG. 1b is a perspective view showing a state in which a door of the constant climate chamber of FIG. 1a is opened. FIG. 2 is a vertical cross-sectional view of the constant climate chamber of FIG. 1a. A constant climate chamber 1 shown in FIGS. 1a, 1b and 2 is a climate chamber used for a climate test, for example, stability test of medicines.

As shown in FIGS. 1a, 1b, and 2, the constant climate chamber 1 is provided with a rectangular parallelepiped upper housing 2 and a rectangular parallelepiped lower housing 3. The upper housing 2 includes a front opening. In the front opening of the upper housing 2, a door 20 capable of opening and closing is provided. At the door 20, an operation panel 21 and a display device 22 are installed.

As shown in FIG. 2, inside the upper housing 2, a partition wall 4 is provided. The partition wall 4 divides a closed space inside the upper housing 2 into an internal space IS, which is a test chamber, and an air conditioning space (hereinafter referred to as an air-conditioning space) 5. In the internal space IS, one or a plurality of shelf boards 23 are installed. On the shelf boards 23, test objects 24 such as medicines, etc. are placed.

In the upper part of the partition wall 4, a blowout port 41 is provided, and in the lower part of the partition wall 4, a suction port 42 is provided. At the vicinity of the blowout port 41, a temperature and humidity sensor SE0 is installed. By the way, the temperature and humidity sensor SE0 may be installed at the vicinity of the suction port 42.

In the air-conditioning space 5, as an air conditioning part, a humidifying part 51, a cooling/dehumidifying part 52, a heating part 53, and a blowing part 54 are arranged. The humidifying part 51 includes a water storing pan 51a and a sheathed heater 51b. The cooling/dehumidifying part 52 includes, for example, a cooling device. The heating part 53 includes, for example, a wire strip heater. The blowing part 54 includes, for example, a sirocco fan. In the back side of the upper housing 2 and the lower housing 3, an exhaust passage 6 is provided.

On the front surface of the lower housing 3, an air introducing port 31 is provided. Inside the lower housing 3, a compressor 32, a cooling fan 33, and a condenser 34 are arranged. The condenser 34 is connected with the cooling/dehumidifying part 52 via a coolant pipe 35. In the coolant pipe 35, an electromagnetic opening/closing valve 38 and an expansion valve 39 are provided. The cooling/dehumidifying part 52 is connected with the compressor 32 via a coolant pipe 36, and the compressor 32 is connected with a condenser 34 via a coolant pipe 37.

The coolant introduced from the cooling/dehumidifying part 52 is introduced to the compressor 32 through the coolant pipe 36, and it is compressed by the compressor 32. The compressed coolant is introduced to the condenser 34 through the coolant pipe 37, and it is condensed by the condenser 34. The condensed coolant is introduced to the expansion valve 39 through the coolant pipe 35 and the electromagnetic opening/closing valve 38, and it is expanded by the expansion valve 39. The expanded coolant is introduced to the cooling/dehumidifying part 52. The humidifying part 51 humidifies air inside the air-conditioning space 5. The cooling/dehumidifying part 52 cools and dehumidifies the humidified air by the evaporation heat of the coolant. The heating part 53 heats the cooled and dehumidified air. As shown in a void arrow, the air in which the temperature and the humidity are adjusted in the air-conditioning space 5 is blown into the inside of an internal space IS through the blowout port 41 by the blowing part 54. The air inside the internal space IS is suctioned into the inside of the air-conditioning space 5 through the suction port 42.

Further, air is introduced into the inside of the lower housing 3 through the air introducing port 31 by the cooling fan 33. Therefore, the condenser 34 is cooled. As shown in the hatching pattern arrow, the air inside the lower housing 3 is exhausted from an exhaust port 61 in the back-surface part through the exhaust passage 6.

Further, as shown in FIGS. 1a and 1b, a controller 7 is provided inside the lower housing 3. The controller 7 controls the humidifying part 51, the cooling/dehumidifying part 52, the heating part 53, and the blowing part 54 based on a measurement value of the temperature and humidity sensor SE0. Therefore, the temperature and the humidity inside the internal space IS are respectively maintained at a set temperature and a set humidity. In the controller 7, an operation panel 21 and a display device 22 are connected.

(2) Calculation Method of Temperature Function

Next, a calculation method of a temperature function used for the temperature characteristic evaluation method according to the present embodiment will be described. The calculation of the temperature function may be performed at a factory prior to factory shipment, or it may be performed at a manufacturer of medicines or a research institution after the factory shipment of the constant climate chamber 1. In a case in which the calculation of the temperature function is performed after the shipment of the constant climate chamber 1, the temperature function is calculated in a state in which a test object 24 is not placed inside the internal space IS or a state in which a test object 24 is placed.

The constant climate chamber 1 of FIGS. 1a and 1b is built inside a room of a building. In the internal space IS of the constant climate chamber 1, one or a plurality of temperature and humidity sensors is installed. In the present embodiment, the temperature and humidity sensors are respectively installed in the eight positions P1 to P8 inside the internal space IS.

Figure 3A:
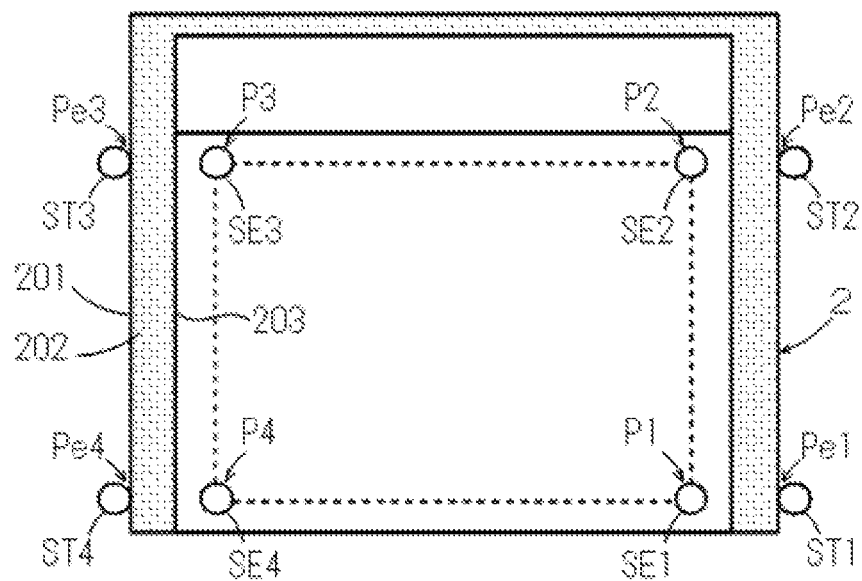
FIG. 3a is a schematic horizontal cross-sectional view showing an arrangement of temperature and humidity sensors positioned at four corners of an upper end of an internal space.
Figure 3B:
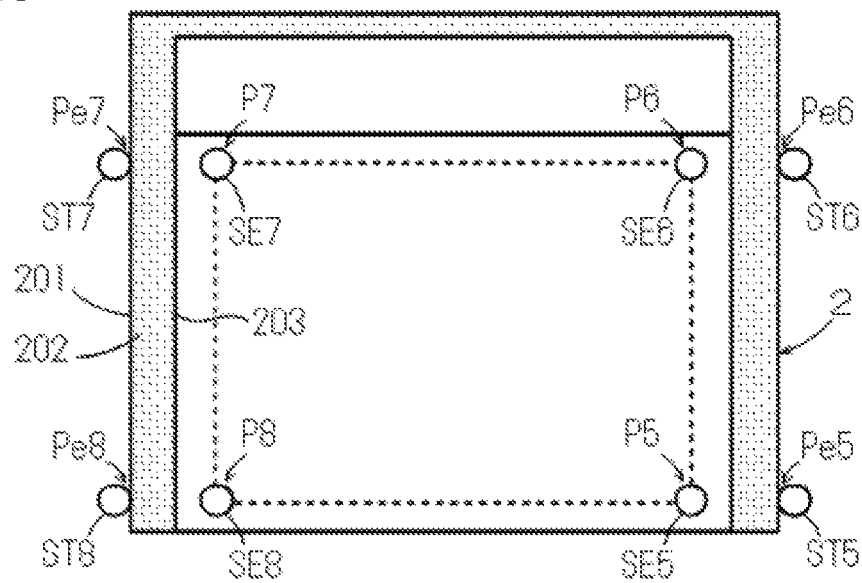
FIG. 3b is a schematic horizontal cross-sectional view showing an arrangement of temperature and humidity sensors positioned at four corners of a lower end of the internal space.

FIG. 3a is a schematic horizontal cross-sectional view showing an arrangement of the temperature and humidity sensors positioned at the four corners of the upper end of the internal space IS. FIG. 3b is a schematic horizontal cross-sectional view showing an arrangement of the temperature and humidity sensors positioned at the four corners of the lower end of the internal space IS.

The upper housing 2 is provided with an external wall 201, a thermal insulation material 202, and an interior wall 203. The external wall 201 is formed by a metal plate, for example, a stainless steel plate, etc. The interior wall 203 is formed by a metal plate, for example, a galvanized steel plate, etc. As the thermal insulation material 202, for example, a hard urethane foam and a glass wool are used.

As shown in FIG. 3a, the temperature and humidity sensors SE1 to SE4 are respectively installed in the four corner positions P1 to P4 of the upper end inside the internal space IS. With respect to the four corner positions P1 to P4 of the upper end inside the internal space IS, the temperature sensors ST1 to ST4 are respectively installed in the four positions Pe1 to Pe4 on the surface of the external wall 201. Further, as shown in FIG. 3b, the temperature and humidity sensors SE5 to SE8 are respectively installed in the four corner positions P5 to P8 of the lower end inside the internal space IS. Further, with respect to the four corner positions P5 to P8 of the lower end inside the internal space IS, the temperature sensors ST5 to ST8 are respectively installed in the four positions Pe5 to Pe8 on the surface of the external wall 201.

The internal temperature and humidity of the internal space IS are measured by the temperature and humidity sensors SE1 to SE8. Further, the ambient temperature of the constant climate chamber 1 is measured by the respective temperature sensors ST1 to ST8. Here, the ambient temperature means the air temperature of a place where the constant climate chamber 1 is installed. In the present embodiment, the ambient temperature is the temperature on the surface of the external wall 201 of the constant climate chamber 1. The ambient temperature may be the temperature in a certain place in the vicinity of the constant climate chamber 1.

In a state in which the door 20 shown in FIG. 1a is closed, a set temperature of the internal space IS is set in a predetermined value by using the operation panel 21. Further, a set humidity of the internal space IS is set in a predetermined value. Therefore, in order to maintain the temperature and the humidity of the blowout port 41 in the internal space IS at the set temperature and the set humidity respectively, the humidifying part 51, the cooling/dehumidifying part 52, the heating part 53, and the blowing part 54 are controlled by the controller 7. The present invention relates to the improvement of the temperature characteristic evaluation method of the internal space IS, so that it does not mention the humidity characteristic evaluation method of the internal space IS. Therefore, in the present embodiment, the temperature function related to the temperature is calculated. The temperature inside the internal temperature IS is not influenced from the variation of the humidity, so that in the present invention, the humidity is not considered in the calculation of the temperature function. The temperature function is calculated by using a computer which is connected to the constant climate chamber 1.

Figure 4:
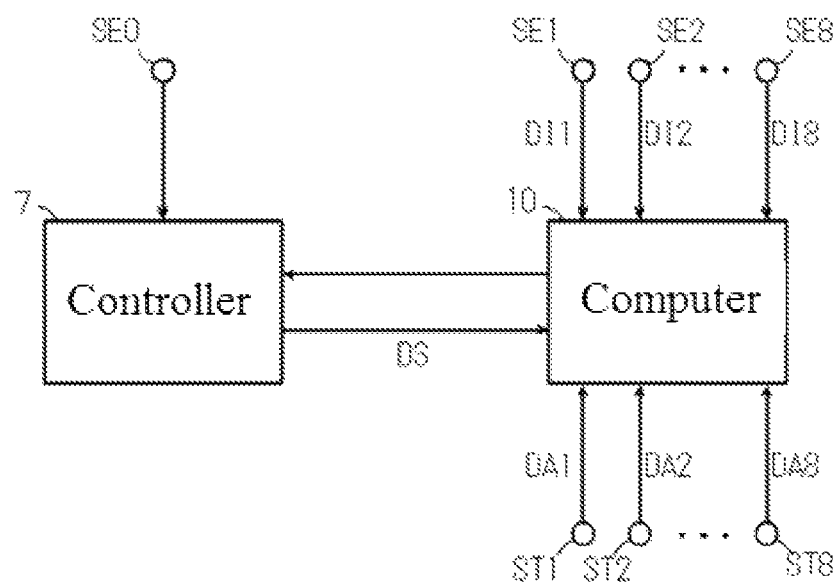
FIG. 4 is a block diagram showing a connection between the constant climate chamber and a computer.

FIG. 4 is a block diagram showing a connection between the constant climate chamber and the computer. As shown in FIG. 4, the computer 10 such as a personal computer, etc. is connected to the controller 7, the temperature and humidity sensors SE1 to SE8, and the temperature sensors ST1 to ST8 of the constant climate chamber 1. The computer 10 acquires a set temperature value as set temperature data DS from the controller 7. Further, the computer 10 acquires measurement values of the internal temperature as internal temperature data DI' to DI8 respectively from the temperature and humidity sensors SE1 to SE8, and acquires measurement values of an ambient temperature as ambient temperature data DA1 to DA8 respectively from the temperature sensors ST1 to ST8.

Figure 5:
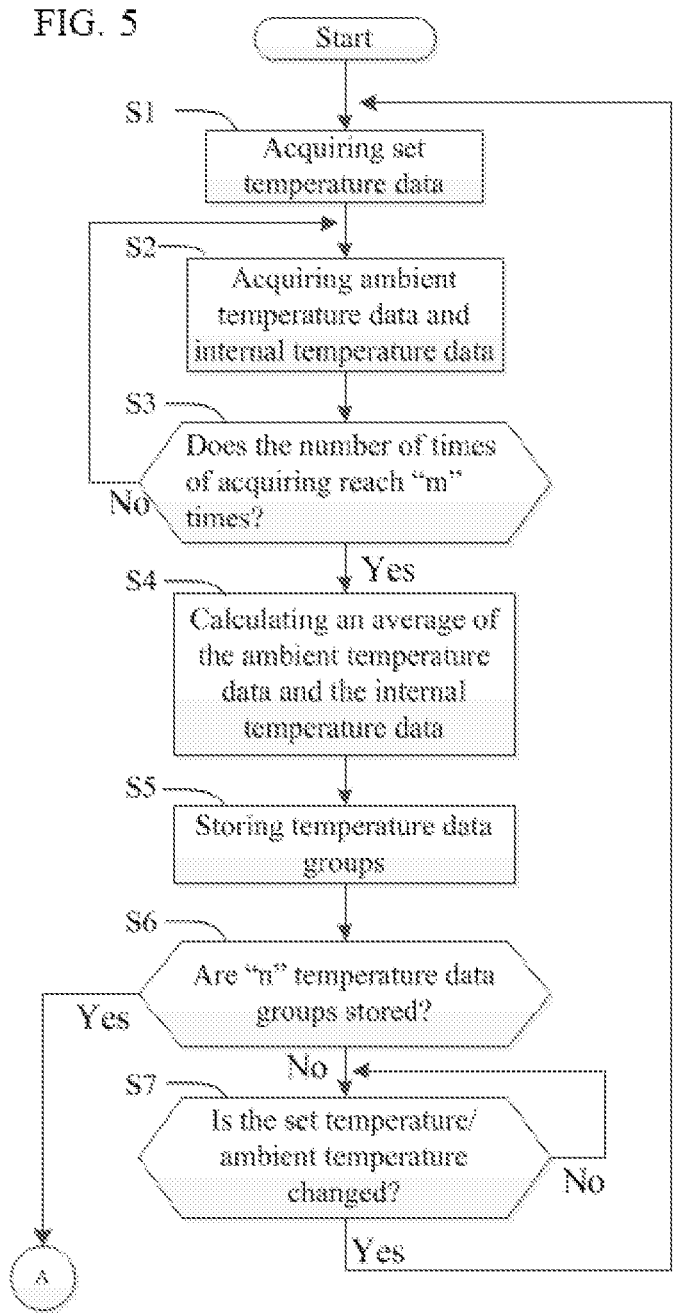
FIG. 5 is a flowchart showing a method for calculating a temperature function.
Figure 6:
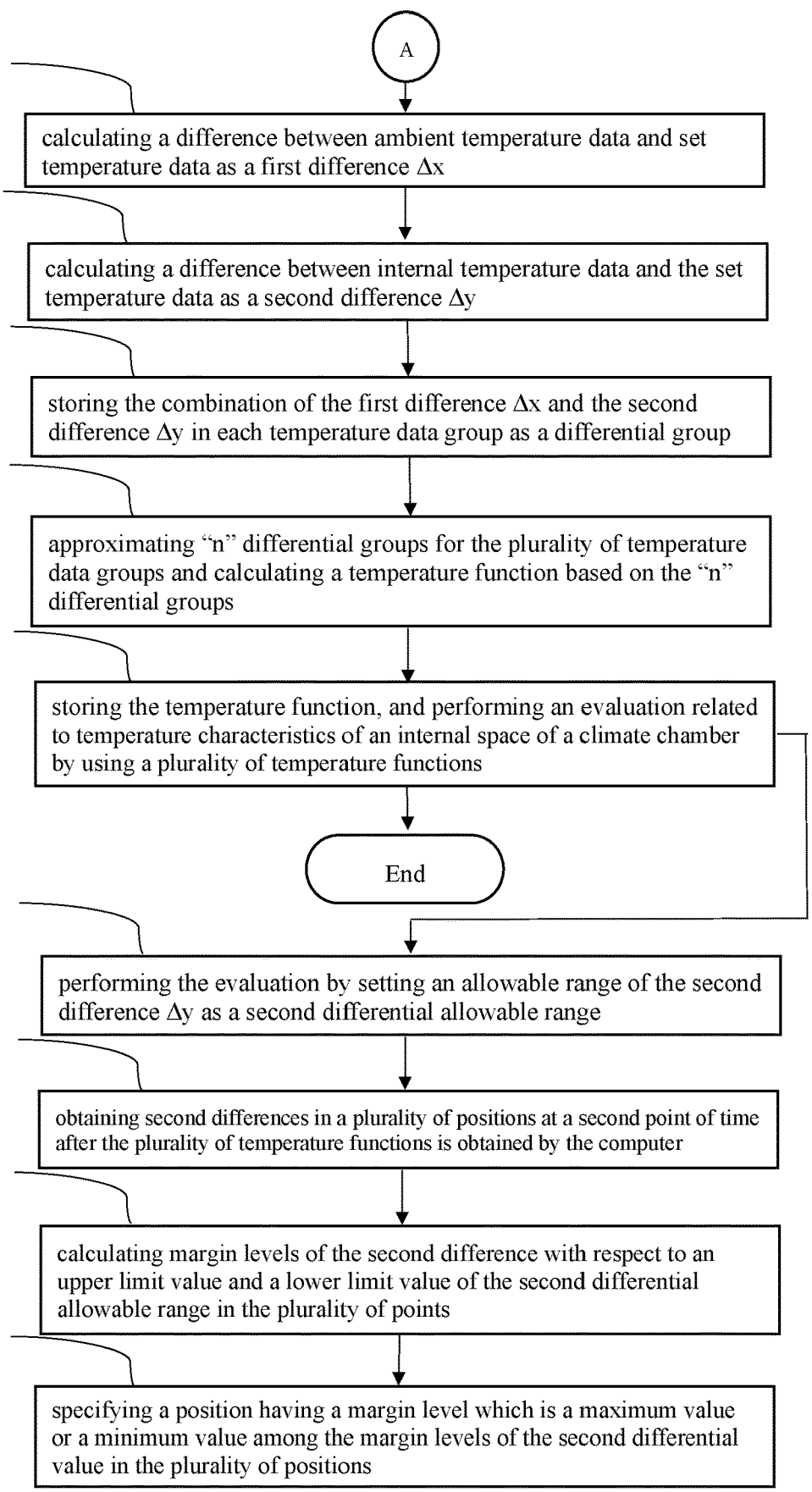
FIG. 6 is a flowchart showing a method for calculating a temperature function.

FIGS. 5 and 6 are a flowchart showing a method for calculating a temperature function. The calculation of the temperature function is performed in each of the plurality of positions P1 to P8, but hereinafter, the calculation method of the temperature function at an arbitrary one position Pi inside the internal space IS will be described. Here, the number "i" is an arbitrary integer of 1 to 8.

First, the operator inputs a set temperature in the controller 7 of the constant climate chamber 1 by using the operation panel 21. After the operation of the constant climate chamber 1 is stabilized, the computer 10 acquires a set temperature value as the set temperature data DS from the controller 7 (Step S1). Next, the computer 10 acquires an ambient temperature measurement value as the ambient temperature data from the temperature sensor STi, and acquires an internal temperature measurement value as the internal temperature data from the temperature and humidity sensor SEi (Step S2).

The computer 10 judges whether or not the number of times of acquiring the ambient temperature data and the internal temperature data reaches "m" times (Step S3). The number "m" is integer of equal to or more than 1. When the number of times of acquiring the ambient temperature data and the internal temperature data does not reach "m" times, the computer 10 returns to Step S2 and acquires the ambient temperature data and the internal temperature data.

When the number of times of acquiring the ambient temperature data and the internal temperature data reaches "m" times, the computer 10 respectively calculates an average value of the acquired "m" ambient temperature data as ambient temperature data DAi and an average value of the acquired "m" internal temperature data as internal temperature data DIi (Step S4), and the combination of the set temperature data DS, the ambient temperature data DAi, and the internal temperature data DIi is stored as a temperature data group (Step S5). By calculating the average value of the ambient "m" temperature data and the average value of the "m" internal temperature data, the effect of the variations of the measurement values of the ambient temperature and the internal temperature due to noise, etc. can be eliminated.

Next, the computer 10 judges whether or not "n" temperature data groups are stored (Step S6). The number "n" is integer of equal to or more than 2. When "n" temperature data groups are not stored, the operator changes at least one of the set temperature and the ambient temperature. The computer 10 judges whether or not at least one of the set temperature and the ambient temperature is changed (Step S7). When any of the set temperature and the ambient temperature is not changed, the computer 10 waits until at least one of the set temperature and the ambient temperature is changed. When at least one of the set temperature and the ambient temperature is changed, the computer 10 performs the processes of Steps S1 to S7, and stores another one temperature data group.

When "n" temperature data groups are stored in Step S6, the computer 10 calculates a difference between the ambient temperature data DAi and the set temperature data DS in each temperature data group (hereinafter referred to as the first difference $\Delta x$)(Step S8). Further, the computer 10 calculates a difference between the internal temperature data DIi and the set temperature data DS in each temperature data group (hereinafter referred to as the second difference $\Delta y$) (Step S9). Further, the computer 10 stores the combination of the first difference $\Delta x$ and the second difference $\Delta y$ in each temperature data group as a differential group (Step S10). In this way, "n" differential groups are obtained.

After that, the computer 10 calculates a temperature function based on the "n" differential groups (Step S11). Specifically, the computer 10 approximates the "n" differential groups in a linear function by a regression analysis and obtains the linear function as a temperature function. The computer 10 stores the obtained temperature function (Step S12). Specifically, an inclination coefficient and an intercept coefficient of the temperature function are stored.

Figure 7:
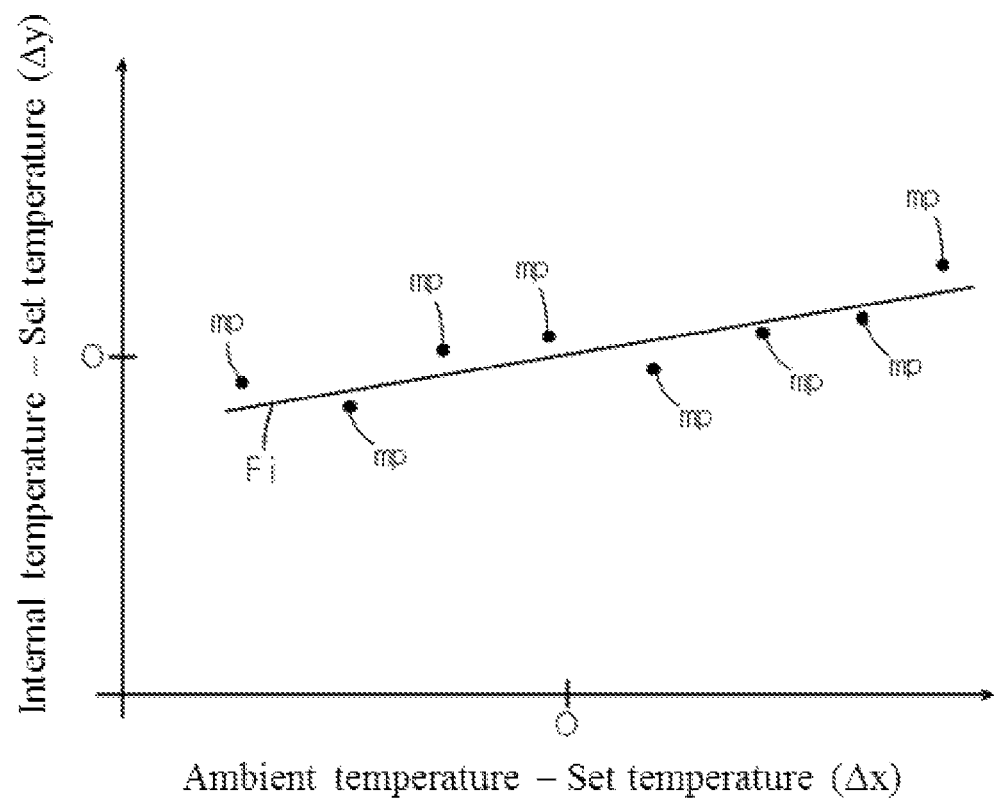
FIG. 7 is a schematic diagram showing an example of the temperature function.

FIG. 7 is a schematic diagram showing an example of the temperature function. The horizontal axis of FIG. 7 indicates the difference between the ambient temperature and the set temperature (the first difference $\Delta x$), and the vertical axis indicates the difference between the internal temperature and the set temperature (the second difference $\Delta y$). Hereinafter, FIG. 8 toll are the same. As shown in FIG. 7, a plurality of differential groups is plotted as measuring points mp on a $\Delta x$-$\Delta y$ plane. The linear function is calculated as a temperature function Fi by the regression analysis of the plurality of measuring points mp. The temperature function Fi is indicated as the following formula.

$$Fi=\Delta y=A\cdot\Delta x+B \qquad (1)$$

In the above formula (1), "A" indicates an inclination coefficient, and "B" indicates an intercept coefficient. The intercept coefficient occurs based on the characteristics of the temperature and humidity sensors. As described later, the temperature characteristics of the internal space of the constant climate chamber 1 can be evaluated by using the temperature function Fi.

(3) Example of Temperature Function

Figure 8:
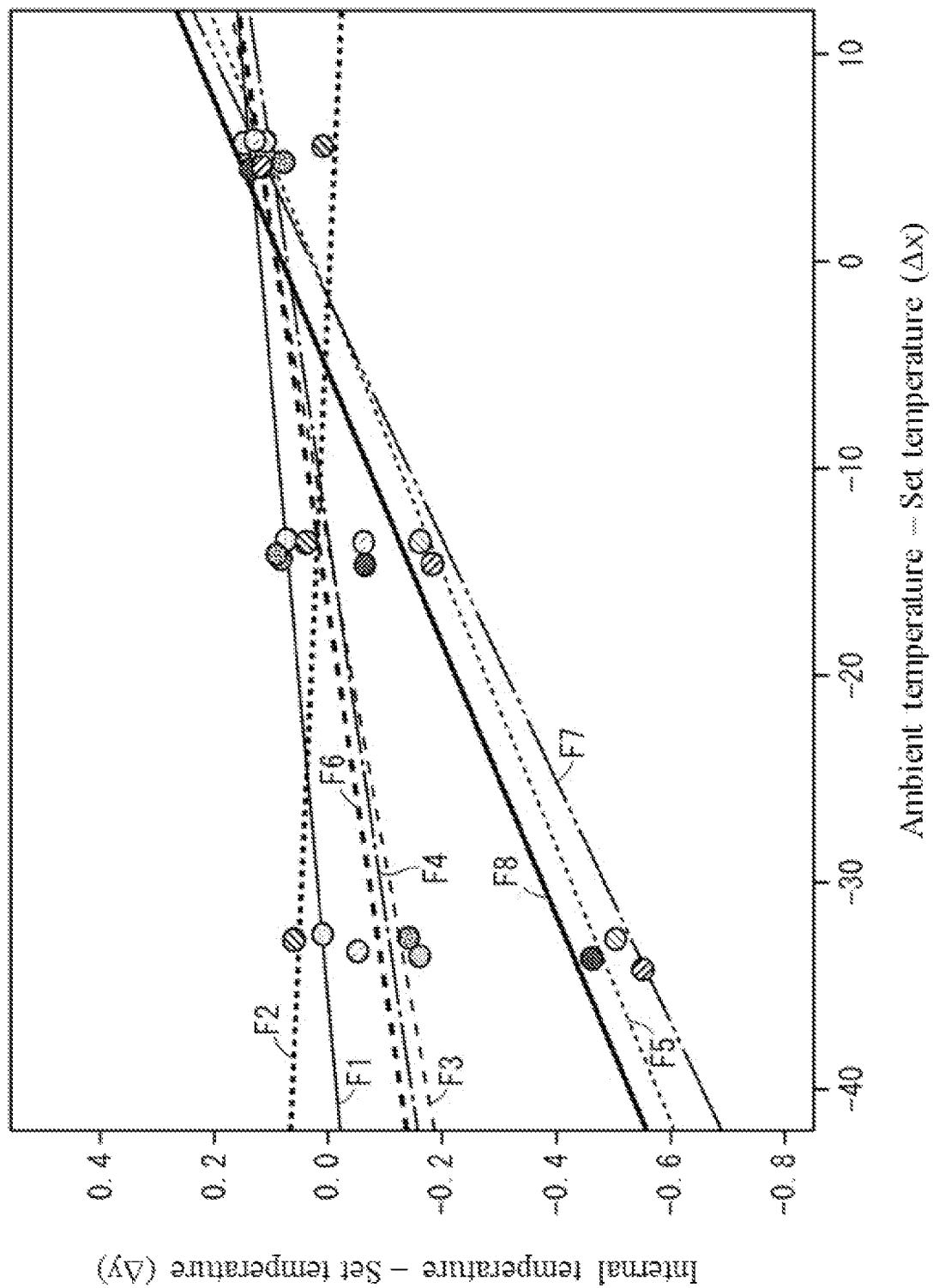
FIG. 8 is a diagram showing an example of the temperature functions in the eight positions inside the internal space of the constant climate chamber.

FIG. 8 is a diagram showing an example of the temperature functions in the eight positions inside the internal space IS of the constant climate chamber 1. In the example of FIG. 8, the set temperature sets 20° C., 40° C., and 60° C., and in each of the set temperatures, the ambient temperature data and the internal temperature data are acquired in the eight positions P1 to P8. In this way, in each of the eight positions P1 to p8, three temperature data groups are acquired, and three differential groups are calculated. In each differential group, the relationship between the first difference $\Delta x$ and the second difference $\Delta y$ is plotted on the $\Delta x$-$\Delta y$ plane. In the eight positions P1 to P8, the temperature functions F1 to F8 are respectively calculated by the method shown in FIGS. 5 and 6.

In the climate test of medicines, it is required to preserve medicines for equal to or more than a fixed period at, for example, 20° C.±2° C., 30° C.±2° C., or 40° C.±2° C. In the example of FIG. 8, the difference between the ambient temperature and the set temperature (the first difference $\Delta x$) is in a range of $-40°$ C. to 10° C., and the difference between the internal temperature and the set temperature (the second difference $\Delta y$) becomes sufficiently smaller than ±2° C.

(4) Evaluation Method Related to Temperature Characteristics of Internal Space IS (a) Evaluation of a Margin Level of the Second Difference $\Delta y$ with Respect to the Second Differential Allowable Range (Steps S13 to S16)

Figure 9:
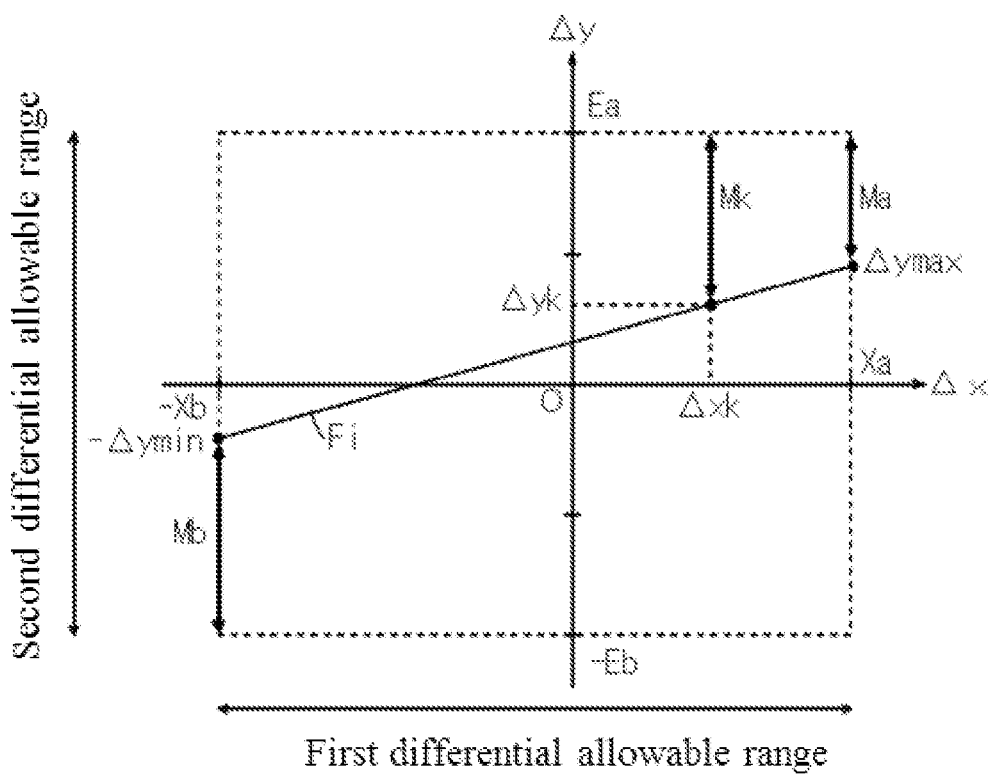
FIG. 9 is a diagram showing an example of a method for setting an allowable coefficient range.

In each temperature function Fi, the margin levels of the second difference $\Delta y$ with respect to the upper limit value and the lower limit value of the second differential allowable range are calculated. FIG. 9 is a diagram showing an example of a method for calculating a margin level of the second difference.

First, a variation range of the first difference $\Delta x$ (hereinafter referred to as the first difference variation range) is set. The first difference variation range is set based on the variation range of the temperature of the air in a place where the constant climate chamber 1 is installed and based on the set temperature. The upper limit value of the first difference variation range is indicated as Xa, and the lower limit value of the first difference variation range is indicated as $-Xb$.

Further, the allowable range of the second difference $\Delta y$ (hereinafter referred to as the second differential allowable range) is set. The second differential allowable range is set in a temperature condition regulated in the climate test. The upper limit value of the second differential allowable range is indicated as Ea, and the lower limit value of the second differential allowable range is indicated as −Eb.

For example, the set temperature is 25° C. and when the ambient temperature is varied in a range of 10° C. to 30° C., the upper limit value Xa of the first difference variation range is 5° C., and the lower limit value −Xb of the first difference variation range is −15° C. Further, when the allowable error of the internal temperature is ±2° C., the upper limit value Ea of the second differential allowable range is +2° C., and the lower limit value −Eb of the second differential allowable range is −2° C.

The maximum value and the minimum value of the second difference Δy in the temperature function Fi within the first difference variation range −Xb to Xa are obtained. In the example of FIG. 9, the second difference Δymax in the upper limit value Xa of the first difference variation range becomes the maximum value, and the second difference −Δymin in the lower limit value −Xb of the first difference variation range becomes the minimum value.

The margin level Ma of the second difference Δymax with respect to the upper limit value Ea of the second differential allowable range is calculated by, for example, the following formula.

$$Ma = Ea - \Delta y\text{max} \quad (2)$$

The margin level Mb of the second difference −Δymin with respect to the lower limit value −Eb of the second differential allowable range is calculated by, for example, the following formula.

$$Mb = Eb - \Delta y\text{min} \quad (3)$$

The margin level having the smaller value among the margin levels Ma, Mb becomes the minimum margin level. In the example of FIG. 9, the margin level Ma is the minimum margin level in the temperature function Fi.

The calculation method of the margin level is not limited to the aforementioned example, but the margin level may be calculated by other methods. For example, the margin level Ma of the second difference Δymax with respect to the upper limit value Ea of the second differential allowable range and the margin level Mb of the second difference −Δymin with respect to the lower limit value −Eb of the second differential allowable range may be calculated by the following formulas.

$$Ma = (Ea - \Delta y\text{max})/Ea \quad (4)$$

$$Mb = (Eb - \Delta y\text{min})/Eb \quad (5)$$

Further, the margin level of the second difference Δyk corresponding to an arbitrary first difference Δxk is calculated by the following method. In a case in which the second difference Δyk has a positive value, the margin level Mk of the second difference Δyk with respect to the upper limit value Ea of the second differential allowable range is calculated by, for example, the following formula (6).

$$Mk = Ea - \Delta yk \quad (6)$$

In a case in which the second difference Δyk has a negative value, the margin level Mk of the second difference Δyk with respect to the lower limit value −Eb of the second differential allowable range is calculated by, for example, the following formula (7).

$$Mk = (Eb + \Delta yk) \quad (7)$$

The second difference Δyk may be calculated by the following formulas.

$$Mk = (Ea - \Delta yk)/Ea \quad (8)$$

$$Mk = (Eb + \Delta yk)/Eb \quad (9)$$

With this, the margin level Mk of the second difference Δyk can be calculated in each of the difference values between the ambient temperature and the set temperature.

Further, the margin level of the second difference Δyk at the arbitrary point of time after the temperature function Fi is obtained is calculated. Here, the second difference Δyk at the arbitrary point of time can be obtained in the following method. By measuring the ambient temperature, the ambient temperature data DAi is obtained, and the set temperature data DS is obtained. The first difference Δxk is calculated from the ambient temperature data DAi and the set temperature data DS. By substituting the calculated first difference Δxk in the first difference Δx of the temperature function Fi of the aforementioned formula (1), the second difference Δyk is calculated. By this method, without measuring the internal temperature during the actual operation of the constant climate chamber 1, the second difference Δyk can be obtained by measuring the ambient temperature. Here, the actual operation means to operate the constant climate chamber 1 for the climate test of the test objects 24.

By the way, at the arbitrary point of time, by measuring the ambient temperature and the internal temperature, the second difference Δyk may be calculated.

At the plurality of points of time, by calculating the margin level of the second difference Δyk with respect to the upper limit value Ea or the lower limit value −Eb of the second differential allowable range, it is possible to estimate whether or not the second difference Δy at an arbitrary point of time during the plurality of points of time or at an arbitrary point of time in the future is within the second differential allowable range.

(b) Evaluation by Inclination Coefficient

Figure 10:
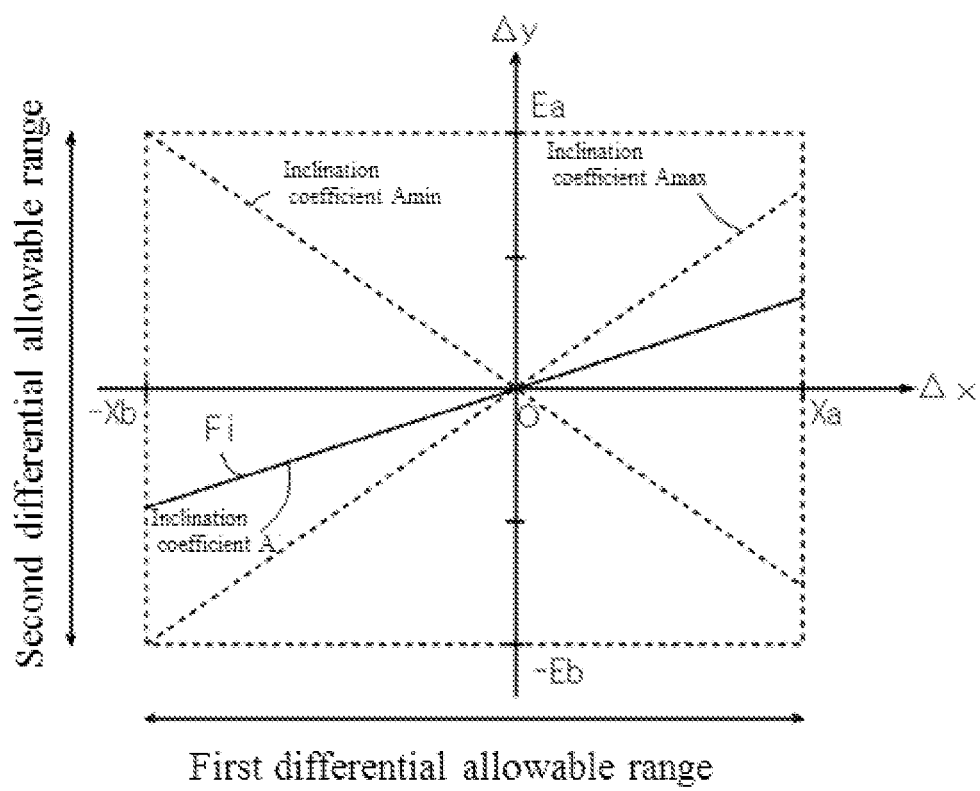
FIG. 10 is a diagram showing an example of a method for calculating a margin level of the second difference.

An inclination coefficient A of each temperature function Fi is calculated. Further, an allowable coefficient range of the inclination coefficient A is set by the following method. FIG. 10 is a diagram showing an example of a method for setting the allowable coefficient range. In the example of FIG. 10, an intercept coefficient B of the temperature function Fi is taken to be 0.

As similar to the example of FIG. 9, the first difference variation range −Xb to Xa and the second differential allowable range −Eb to Ea are set. In this case, when the first difference Δx is varied within the first difference variation range −Xb to Xa by the variation of the ambient temperature, the second difference Δy is within the second differential allowable range −Eb to Ea, so that the maximum inclination coefficient is Amax and the minimum inclination coefficient is Amin. That is, the allowable coefficient range of the temperature function is equal to or more than Amin and equal to or less than Amax.

When the inclination coefficient A of each temperature function Fi is within the allowable coefficient range Amin to Amax, the variation of the difference (the second difference Δy) between the internal temperature and the set temperature by the variation of the ambient temperature is within the second differential allowable range Eb to Ea. Therefore, based on whether or not the inclination coefficient A of each temperature function Fi is within the allowable coefficient range Amin to Amax, it is possible to judge whether or not the variation of the internal temperature by the variation of the ambient temperature is within the regulated allowable range. With this, the evaluation related to the temperature characteristics of the internal space of the constant climate chamber 1 can be performed.

The setting method of the allowable coefficient range is not limited to the aforementioned example. For example, by adding a predetermined value to the inclination coefficient Ai of each temperature function Fi which is calculated at first, the upper limit value of the allowable coefficient range may be determined. By subtracting a predetermined value from the inclination coefficient Ai of each temperature function Fi, the lower limit value of the allowable coefficient range may be determined. In this case, the inclination coefficient Ai of each temperature function Fi±the range of the predetermined value is set as the allowable coefficient range.

(c) Evaluation by Coefficient of Determination

In each of the plurality of positions P1 to P8, based on the plurality of differential groups (Δx, Δy) and each temperature function Fi, the coefficient of determination of each temperature function Fi is calculated. The coefficient of determination indicates a degree of which the temperature function Fi is fit with respect to the plurality of differential groups (Δx, Δy) obtained by actual measurements. Based on the coefficient of determination calculated in each temperature function Fi, it is possible to judge whether or not the temperature characteristics are evaluated by using the temperature function in each of the positions P1 to P8 inside the internal space IS. For example, when the decision variable of the temperature function Fi is equal to or more than a threshold value which is preliminary set, it can be judged that the temperature characteristics can be evaluated by using the temperature function in the position corresponding to the temperature function Fi. On the other hand, when the decision variable of the temperature function Fi is less than the threshold value which is preliminary set, it can be judged that the temperature characteristics cannot be evaluated by using the temperature function in the position corresponding to the temperature function Fi.

(d) Determination of Allowable Range of Variation of Ambient Temperature

Figure 11:
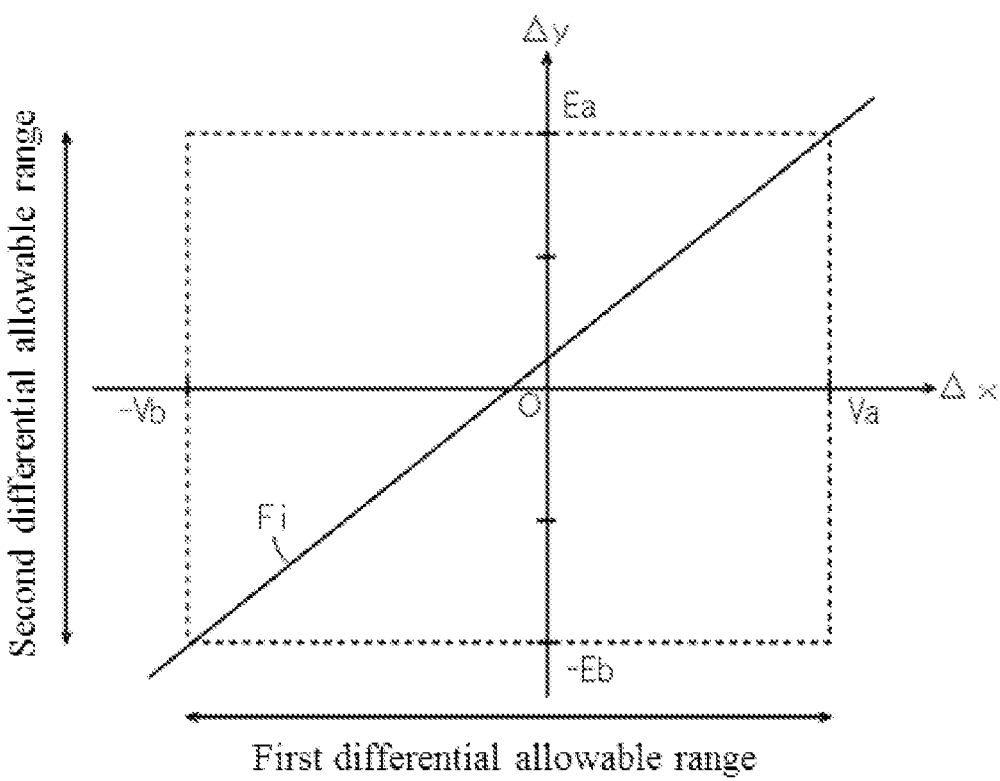
FIG. 11 is a diagram showing an example of method for determining an allowable range of ambient temperature variations.

An allowable range of variation of an ambient temperature in each set temperature can be determined by using each temperature function Fi. FIG. 11 is a diagram showing an example of a determination method of the allowable range of the variation of the ambient temperature.

By substituting the upper limit value Ea of the second differential allowable range to the second difference Δy of the temperature function Fi of the aforementioned formula (1), the following formula is obtained.

$$Ea = A \cdot \Delta x + B \quad (10)$$

The following formula is obtained by the above formula (10).

$$\Delta x = (Ea - B)/A = Va \quad (11)$$

The upper limit value Va of the first differential allowable range is calculated by the above formula (11).

Similarly, by substituting the lower limit value −Eb of the second differential allowable range to the second difference Δy of the temperature function Fi of the aforementioned formula (1), the following formula is obtained.

$$-Eb = A \cdot \Delta x + B \quad (12)$$

The following formula is obtained by the above formula (12).

$$\Delta x = (-Eb - B)/A = -Vb \quad (13)$$

The lower limit value −Vb of the first differential allowable range is calculated by the above formula (13).

By the upper limit value Va and the lower limit value −Vb of the first differential allowable range, the internal temperature of the constant climate chamber 1 can determine the allowable range of the variation of the ambient temperature in order to satisfy the temperature condition. For example, the set temperature is 40° C., the upper limit value Va of the first differential allowable range is 10° C., and the lower limit value −Vb is −35° C. In this case, the allowable range of the variation of the ambient temperature becomes 5° C. to 50° C. In this example, when the ambient temperature is varied within the range of 5° C. to 50° C., the internal temperature of the constant climate chamber 1 can satisfy the temperature condition.

(e) Judgment of Worst Point and Best Point

In the present embodiment, the temperature functions F1 to F8 in the plurality of positions P1 to P8 of the internal space IS of the constant climate chamber 1 are obtained. A worst point and a best point related to the temperature characteristics of the internal space IS of the constant climate chamber 1 are judged by any of the following judgement methods based on the plurality of temperature functions F1 to F8.

In the first judgment method, the minimum margin levels calculated in the plurality of temperature functions F1 to F8 are used. Among the minimum margin levels for the plurality of temperature functions F1 to F8, the position corresponding to the temperature function having the least minimum margin level is judged as the worst point. Further, among the minimum margin levels for the plurality of temperature functions F1 to F8, the position corresponding to the temperature function having the most minimum margin level is judged as the best point.

Further, at arbitrary points, the margin levels of the second difference Δy corresponding to the arbitrary first difference Δxk in the plurality of points P1 to P8 are calculated, and the position having the least margin level may be judged as the worst point, and the position having the most margin level may be judged as the best point. In this case, at the arbitrary points, depending on the difference (the first difference Δx) between the ambient temperature and the set temperature, the worst point and the best point can be judged.

In the second judgement method, the inclination coefficients A of the plurality of temperature functions F1 to F8 are used. In this case, the absolute values of the inclination coefficients A of the plurality of temperature functions F1 to F8 are calculated. The position corresponding to the temperature function having the absolute value of the most inclination coefficient A is judged as the worst point, and the position corresponding to the temperature function having the absolute value of the least inclination coefficient A is judged as the best point.

By the way, by combining the first and second judgement methods, the worst point and the best point may be judged.

When the second difference Δy in the worst point of the internal space IS of the constant climate chamber 1 is within the second differential allowable range, it can be judged that the second difference Δy in other positions is also within the second differential allowable range. Therefore, by monitoring the second difference Δy in the worst point, it can be confirmed that the internal temperatures in all positions of the internal space IS satisfy the temperature condition.

Further, by placing the test objects 24 close to the position having the best point in the internal space IS of the constant climate chamber 1, the climate test in the stable temperature atmosphere can be performed.

(5) Climate Test for Medicines

Next, an example of a climate test for medicines by using the temperature characteristic evaluation method according to the embodiment of the present invention will be described. In the climate test for medicines, the medicines are preserved in a fixed period of time under the environment satisfying a fixed temperature condition and a fixed humidity condition, and whether or not the effect of the medicines maintains is tested. For example, the temperature condition of a long-term preservation test is 25° C.±2° C. or 30° C.±2° C., and the minimum test period is 12 months. The temperature condition of an acceleration test is 40° C.±2° C., and the minimum test period is 6 months. In order to guarantee that these climate tests are conducted under the environment satisfying the required temperature condition, it is required to evaluate the temperature characteristics of the constant climate chamber 1.

Figure 12:
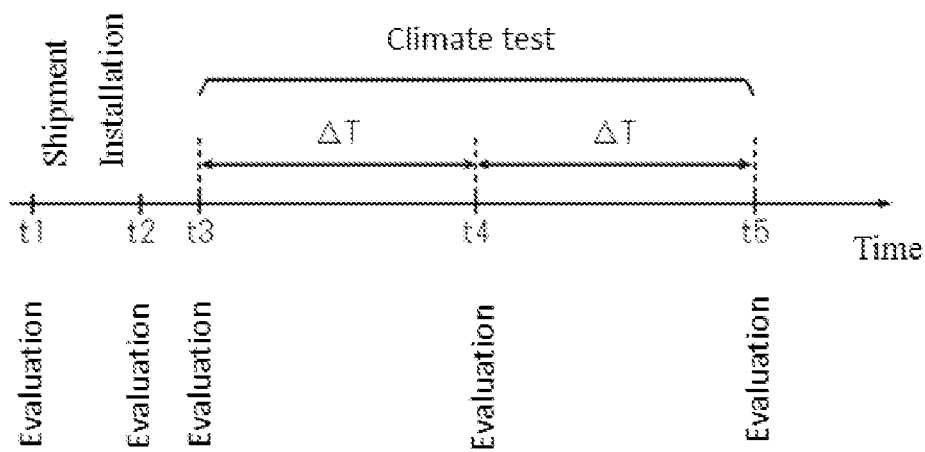
FIG. 12 is a diagram showing an example of a climate test for medicines.

FIG. 12 is a diagram showing an example of the climate test for medicines. First, after the constant climate chamber 1 is manufactured in a factory, at the point of time t1 of the inspection before the shipment, the temperature characteristics of the internal space IS of the constant climate chamber 1 are evaluated. In the evaluation at the point of time t1, the plurality of temperature and humidity sensors SE1 to SE8 and the plurality of temperature sensors ST1 to ST8 are installed in the constant climate chamber 1, and the temperature functions F1 to F8 in the plurality of positions P1 to P8 of the internal space IS are calculated by the method shown in FIGS. 5 and 6. By using the plurality of temperature functions F1 to F8, in the positions P1 to P8, the evaluations of the temperature characteristics are performed by the aforementioned methods. For example, for all of the temperature functions F1 to F8, it confirms that the minimum margin levels are equal to or more than a predetermined standard value, the absolute values of the inclination coefficients A are equal to or more than a predetermined standard value, and the coefficients of determination of the plurality of temperature functions F1 to F8 are equal to or more than a predetermined standard value.

Next, at the point of time t2 in which the constant climate chamber 1 is installed inside a room of a building of a delivery destination, the temperature characteristics of the internal space IS of the constant climate chamber 1 are evaluated. In the evaluation at the point of time t2, as similar to the evaluation at the point of time t1, the temperature functions F1 to F8 in the plurality of positions P1 to P8 of the internal space IS are calculated, and by using the calculated temperature functions F1 to F8, in the positions P1 to P8, the evaluations of the temperature characteristics are performed by the aforementioned methods. The evaluations at the point of time t2 are performed in a state in which the test objects 24 are not placed inside the internal space IS of the constant climate chamber 1 and in a state in which the test objects 24 are placed inside the internal space IS of the constant climate chamber 1.

After that, the temperature characteristics of the internal space IS of the constant climate chamber 1 are evaluated at the point of time t3 of which the climate test starts. The evaluations at the point of time t3 are performed in a state in which the test objects 24 are placed inside the internal space IS of the constant climate chamber 1. The evaluations may be performed before placing the test objects 24 inside the internal space IS of the constant climate chamber 1.

In this case, the second difference Δy is obtained in each of the plurality of positions P1 to P8 of the internal space IS, and the margin level of each of the obtained second differences Δy is evaluated. Further, the plurality of temperature functions F1 to F8 in the plurality of positions P1 to P8 of the internal space IS are calculated, and for the plurality of temperature functions F1 to F8, the margin levels, the inclination coefficients or the coefficients of determination may be evaluated. Alternatively, only for the worst point of the internal space IS, the second difference Δy is obtained, and the margin level of the obtained second difference Δy may be evaluated. Further, only for the worst point of the internal space IS, the temperature function is calculated, and for the calculated temperature function, the margin level, the inclination coefficient, or the coefficient of determination may be evaluated.

At the point of time t4 after elapsing a fixed period of time ΔT from the point of time t3 of which the climate test starts, the temperature characteristics of the internal space IS of the constant climate chamber 1 are evaluated. At the evaluation of the point of time t4, the door 20 is temporary opened, and after installing the plurality of temperature and humidity sensors SE1 to SE8 and the plurality of temperature sensors ST1 to ST8, the door 20 is closed. After that, after the measurement value of the temperature and humidity sensor S0 of the constant climate chamber 1 is stabilized in the set temperature, by measuring the internal temperature and the ambient temperature in each of the positions P1 to P8, the second difference Δy is obtained, and the margin level of each the obtained second difference Δy is evaluated.

At the point of time t4, the plurality of temperature functions F1 to F8 in the plurality of positions P1 to P8 of the internal space IS are calculated, and for the plurality of temperature functions F1 to F8, the margin levels, the inclination coefficients or the coefficients of determination may be evaluated. Alternatively, only for the worst point of the internal space IS, the second difference Δy is obtained, and the margin level of the obtained second difference Δy may be evaluated. Further, only for the worst point of the internal space IS, the temperature function is calculated, and for the calculated temperature function, the margin level, the inclination coefficient, or the coefficient of determination may be evaluated.

In the evaluation at the point of time t4, without measuring the internal temperature of the positions P1 to P8, only the ambient temperatures at the positions Pe1 to Pe8 may be measured. In this case, based on the ambient temperatures and the set temperature, the values of the first difference Δx are calculated, and by substituting the values of the first difference Δx to the first difference Δx of the aforementioned formula (1), the second differences Δy are calculated. Whether or not each of the obtained second differences Δy is within the second differential allowable range (e.g., ±2° C.) is confirmed, and the margin level of each of the obtained second differences Δy is evaluated. Alternatively, only for the worst point of the internal space IS, the second difference Δy is obtained, and whether or not the obtained second difference Δy is within the second differential allowable range is confirmed, and the margin level of the obtained second difference Δy may be evaluated. When the value of the second difference Δy is within the second differential allowable range in the worst point, it is estimated that the values of the second differences Δy in other positions are within the second differential allowable range.

Based on the temperature functions F1 to F8 calculated in the evaluations at the point of time t3 and the second differences Δy obtained in the evaluations at the point of time t4, it can estimate whether or not the difference between the internal temperature and the set temperature in each of the positions P1 to P8 during the period of time from the point of time t3 to the point of time t4 maintains within the second differential allowable range. Further, based on the temperature functions F1 to F8 calculated in the evaluations at the point of time t3 and the temperature functions F1 to F8 calculated in the evaluations at the point of time t4, it can estimate the presence or the absence of the variations of the temperature characteristics of the internal space during the period of time from the point of time t3 to the point of time t4.

In the evaluation at the point of time t4, only for the worst point, the second differences $\Delta y$ may be obtained. In this case, when the second differences $\Delta y$ is within the second differential allowable range in the worst point, it is estimated that the second differences $\Delta y$ in other positions are within the second differential allowable range. Further, only for the worst point of the internal space IS, the temperature function is calculated, for the calculated temperature function, the margin level, the inclination coefficient, or the coefficient of determination may be evaluated.

At the point of time t5 after elapsing a fixed period of time $\Delta T$ from the point of time t4, in the method similar to the point of time t4, the temperature characteristics of the internal space IS of the constant climate chamber 1 are evaluated. Based on the temperature functions F1 to F8 calculated at the point of time t2 or the point of time t3 and the second differences $\Delta y$ obtained at the point of time t4 and the point of time t5, it can estimate whether or not the differences between the internal temperature and the set temperature in each of the positions P1 to P8 in the period of time from the point of time t3 to the point of time t4 and in the period of time from the point of time t4 to the point of time t5 are maintained within the second differential allowable range. Further, based on the temperature functions F1 to F8 calculated in the evaluations at the point of time t4 and the temperature functions F1 to F8 calculated in the evaluations at the point of time t5, it can estimate the presence or the absence of the variations of the temperature characteristics of the internal space in a period of time from the point of time t4 to the point of time t5.

Further, by measuring the ambient temperature during the period of time from the point of time t3 to the point of time t4 and the period of time from the point of time t4 to the point of time t5, based on the temperature functions F1 to F8, at an arbitrary point of time, the second difference $\Delta y$ can be obtained. Therefore, it can be guaranteed that the internal temperature in each of the positions P1 to P8 at the arbitrary point of time during the period of time from the point of time t3 to the point of time t4 and the period of time from the point of time t4 to the point of time t5 satisfies the temperature condition.

(6) Effect of Embodiment

The temperature function Fi obtained by the temperature characteristic evaluation method according to the present embodiment indicates the effect which influences the difference between the internal temperature and the set temperature. The first difference $\Delta x$ in the temperature function Fi can be obtained by changing at least one of the set temperature and the ambient temperature, so that without changing the ambient temperature largely, the first difference $\Delta x$ can be obtained in a wide temperature range. Therefore, the temperature function Fi can be calculated with high accuracy. By using such temperature function Fi, it is possible to estimate the internal temperature at an arbitrary point of time with high accuracy. Accordingly, it is possible to evaluate the temperature characteristics in the internal space IS of the climate chamber with a low cost and high reliability. As a result, it is possible to guarantee the functions of the constant climate chamber 1 during the climate test with a low cost and high reliability.

Further, when the set temperature of the constant climate chamber 1 is changed, the period of time for stabilizing the temperature is shorter than the case in which the ambient temperature of the constant climate chamber 1 is changed, and the power consumption becomes low. In the temperature characteristic evaluation method according to the present embodiment, it is possible to calculate the temperature function Fi by changing the set temperature without changing the ambient temperature. Therefore, it is possible to reduce the waiting time and the power consumption.

(7) Other Embodiments

In the aforementioned embodiments, the temperature and humidity sensor SE0 for controlling the temperature of the internal space IS of the constant climate chamber 1 in the set temperature is arranged in the vicinity of the blowout port 41. However, the temperature and humidity sensor SE0 may be arranged in the vicinity of the suction port 42, or the temperature and humidity sensor SE0 may be arranged in the vicinity of the blowout port 41 and the vicinity of the suction port 42, or the temperature and humidity sensor SE0 may be arranged in other positions inside the internal space IS.

In the aforementioned embodiments, the plurality of temperature sensors ST1 to ST8 for measuring the ambient temperature is arranged to contact with the surface of the external wall 201 of the constant climate chamber 1. However, the plurality of temperature sensors ST1 to ST8 may be arranged in a space vicinity of the external wall 201 of the constant climate chamber 1. Further, with respect to the plurality of temperature and humidity sensors SE1 to SE8, one or the plurality of temperature sensors may be commonly arranged.

In the aforementioned embodiments, in order to calculate the plurality of temperature functions F1 to F8, the computer 10 is connected to the controller 7. However, the controller 7 may include the functions of the computer 10.

Effect of the Invention

According to the present invention, it becomes possible to evaluate temperature characteristics of an internal space of a climate chamber with a low cost and high reliability.

(1) The temperature characteristics mean, for example, an influence degree in which the internal temperature is influenced by variations of the ambient temperature, or an influence degree in which a margin level of the second difference is influenced by variations of the ambient temperature.

By the temperature characteristic evaluation method, the first difference indicating the difference between the climate chamber and the ambient temperature and the second difference indicating the difference between the internal temperature of the climate chamber and the set temperature are obtained, and the temperature function indicating the relationship between the first difference and the second difference is obtained. Here, the function indicates the difference between the internal temperature and the set temperature, and the temperature function indicates an influence of the ambient temperature to the difference between the internal temperature and the set temperature. The first difference in the temperature function is obtained by changing at least one of the set temperature and the ambient temperature, so that without changing the ambient temperature largely, the plurality of values of the first difference can be obtained in a wide range. Therefore, the temperature function can be obtained with high accuracy. By using such temperature function, it is possible to evaluate the internal temperature at an arbitrary point of time with high accuracy. Further, accordingly, it is possible to evaluate temperature characteristics in the internal space of the climate chamber with a low cost and with high accuracy.

(2) Based on the result whether or not the inclination coefficient of the temperature function is within the allowable coefficient range, whether or not the variation of the difference between the internal temperature and the set temperature due to the variation of the ambient temperature is within the allowable range can be judged. Therefore, it is possible to evaluate the function related to the temperature characteristics of the internal space of the climate chamber.

(3) Based on the coefficient of determination, whether or not the temperature characteristics of the internal space can be evaluated by using the temperature function can be judged.

(4) It can judge how much margin level has the difference between the internal temperature and the set temperature with respect to the upper limit value or the lower limit value of the second differential allowable range. Therefore, it is possible to estimate whether or not the difference between the internal temperature and the set temperature is within the second differential allowable range at an arbitrary point of time.

(5) The second difference at the first point of time can be calculated by measuring the ambient temperature at the first point of time. Therefore, without measuring the internal temperature, the temperature characteristics of the internal space at the first point of time can be evaluated.

(6) Since the second difference is within the second differential allowable range, the required upper limit value and the required lower limit value of the allowable range of the ambient temperature can be judged. Accordingly, by adjusting the ambient temperature within the allowable range, it is possible to maintain the difference between the internal temperature and the set temperature within the second differential allowable range.

(7) It is possible to evaluate the temperature characteristics of the internal space in each position based on the temperature functions in a plurality of positions within the internal space of the climate chamber.

(8) By monitoring the internal temperature in a position having the worst temperature characteristic inside the internal space of the climate chamber, the temperature characteristics in other positions of the internal space can be evaluated.

(9) It is possible to evaluate the temperature characteristics in the plurality of positions of the internal space at the second point of time.

(10) The position having the worst temperature characteristic or the position having the best temperature characteristic inside the internal space of the climate chamber can be specified.

For example, among minimum margin levels for a plurality of temperature functions, a position corresponding to a temperature function having the least minimum margin level is judged as a worst point. Alternatively, a position corresponding to a temperature function having an absolute value of the most inclination coefficient is judged as a worst point.

Further, among minimum margin levels for a plurality of temperature functions, a position corresponding to a temperature function having the most minimum margin level is judged as a best point. Alternatively, a position corresponding to a temperature function having an absolute value of the least inclination coefficient is judged as a best point.

(11) The difference between the internal temperature and the set temperature can be calculated by measuring the ambient temperature at the second point of time. Therefore, it is not required to arrange thermometers in the internal space for measuring the internal temperature, so that the operation cost and the component cost are reduced.

(12) The temperature in a position where it is easily influenced to the internal temperature is obtained as an ambient temperature. Accordingly, the accuracy of the evaluation of the temperature characteristics is improved. Further, the measurement of the ambient temperature can be easily performed.

(13) It is possible to measure the internal temperature while securing the space for placing test objects.

(14) The influence of the variations of the ambient temperature data and the internal temperature data due to noise, etc. can be reduced.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A temperature characteristic evaluation method for evaluating temperature characteristics in an internal space of a climate chamber which operates to maintain a temperature in the internal space of the climate chamber, the temperature characteristic evaluation method comprising the steps of:
    (1) obtaining a predetermined set temperature of the climate chamber by a controller inside the climate chamber;
    (2) acquiring an ambient temperature data wherein the first ambient temperature data is measured by a first temperature sensor installed on the exterior wall of the climate chamber;
    (3) acquiring an internal temperature data wherein the first internal temperature data is measured by a second temperature sensor installed inside the internal space;
    (4) storing the predetermined set temperature, the ambient temperature data, and the internal temperature data as a temperature data group;
    (5) changing the set temperature of the climate chamber by a controller inside the climate chamber or detecting a change in the ambient temperature;
    (6) repeating steps 1-5 a predetermined number of times;
    (7) calculating a first difference by calculating a difference between ambient temperature and set temperature data;
    (8) calculating a second difference by calculating a difference between internal temperature and set temperature data;
    (9) determining a differential group by the combination of the first difference and the second difference in a plurality of temperature data groups;
    (10) approximating the plurality of differential groups by a regression analysis and obtaining a temperature function; and
    (11) performing an evaluation related to the temperature characteristics of the internal space of the climate chamber by using the temperature function.

2. The temperature characteristic evaluation method according to claim 1, wherein the step of (11) performing the evaluation includes a step of setting an allowable range for a second difference as a second differential allowable range; a step of obtaining a second difference by the computer; and a step of calculating a margin level of the second difference at an upper limit value or a lower limit value of the second differential allowable range.

3. The temperature characteristic evaluation method according to claim 1, wherein the climate chamber includes an air-conditioning part, a blowout port blowing air conditioned by the air-conditioning part into the internal space, and a suction port suctioning air of the internal space into the air-conditioning part, and
    wherein the set temperature is a temperature of the air of the blowout port or the suction port.

4. A temperature characteristic evaluation method for evaluating temperature characteristics in an internal space of a climate chamber, which operates to maintain a temperature in the internal space of the climate chamber, the temperature characteristic evaluation method comprising the steps of:
    (1) obtaining a predetermined set temperature of the climate chamber by a controller inside the climate chamber;
    (2) acquiring an ambient temperature data wherein the first ambient temperature data is measured by a first temperature sensor installed on the exterior wall of the climate chamber;
    (3) acquiring an internal temperature data wherein the first internal temperature data is measured by a plurality of second temperature sensors, wherein each second temperature sensor is installed in a different position inside the internal space;
    (4) storing the predetermined set temperature, the ambient temperature data, and the internal temperature data as a temperature data group;
    (5) changing the set temperature of the climate chamber by a controller inside the climate chamber or detecting a change in the ambient temperature;
    (6) repeating steps 1-5 a predetermined number of times;
    (7) calculating a first difference by calculating a difference between ambient temperature and set temperature data;
    (8) calculating a second difference by calculating a difference between internal temperature and set temperature data;
    (9) determining a differential group by the combination of the first difference and the second difference in a plurality of temperature data groups;
    (10) approximating the plurality of differential groups by regression analysis and obtaining a plurality of temperature functions with respect to each position of the plurality of second temperature sensors; and
    (11) performing an evaluation related to the temperature characteristics of the internal space of the climate chamber by using the plurality of temperature functions.

5. The temperature characteristic evaluation method according to claim 4, wherein the step of (6) performing the evaluation includes a step of setting an allowable range for a second difference as a second differential allowable range; a step of obtaining a second difference in each of the plurality of positions by the computer; and a step of calculating a margin level of the second difference, which is obtained in the step of obtaining, at an upper limit value or a lower limit value of the second differential allowable range.

6. The temperature characteristic evaluation method according to claim 4, wherein the climate chamber includes an air-conditioning part, a blowout port blowing air conditioned by the air-conditioning part into the internal space, and a suction port suctioning air of the internal space into the air-conditioning part, and
    wherein the set temperature is a temperature of the air of the blowout port or the suction port.

7. A temperature characteristic evaluation method for evaluating temperature characteristics in an internal space of a climate chamber which operates to maintain a temperature in the internal space of the climate chamber, the temperature characteristic evaluation method comprising the steps of:
    (1) obtaining a predetermined set temperature of the climate chamber by a controller inside the climate chamber;
    (2) acquiring an ambient temperature data wherein the first ambient temperature data is measured by a first temperature sensor installed on the exterior wall of the climate chamber:
    (3) acquiring an internal temperature data wherein the first internal temperature data is measured by a plurality of second temperature sensors, wherein each second temperature sensor is installed in a different position inside the internal space;

(4) storing the predetermined set temperature, the ambient temperature data, and the internal temperature data as a temperature data group;
(5) changing the set temperature of the climate chamber by a controller inside the climate chamber or detecting a change in the ambient temperature;
(6) repeating steps 1-5 a predetermined number of times;
(7) calculating a first difference by calculating a difference between ambient temperature and set temperature data;
(8) calculating a second difference by calculating a difference between internal temperature and set temperature data;
(9) determining a differential group by the combination of the first difference and the second difference in a plurality of temperature data groups;
(10) approximating the plurality of differential groups by regression analysis and obtaining a plurality of temperature functions with respect to each position of the plurality of second temperature sensors;
(11) setting a differential allowable range for the second difference wherein the differential allowable range has a minimum and a maximum value for each second temperature sensor;
(12) in response to the obtaining the plurality of temperature functions, obtaining a maximum and a minimum second difference for each second temperature sensor; and
(13) calculating margin levels of the second difference based on the differential allowable range and the maximum and minimum second difference in each position of the plurality of second temperature sensors.

8. The temperature characteristic evaluation method according to claim 7, wherein the climate chamber includes an air-conditioning part, a blowout port blowing air conditioned by the air-conditioning part into the internal space, and a suction port suctioning air of the internal space into the air-conditioning part, and wherein the set temperature is a temperature of the air of the blowout port or the suction port.

* * * * *